(12) United States Patent
Miura et al.

(10) Patent No.: US 6,254,332 B1
(45) Date of Patent: Jul. 3, 2001

(54) NUT FEEDER FOR FEEDING NUTS FOR RESISTANCE WELDING

(75) Inventors: Masaaki Miura; Kouji Sakota, both of Hiroshima (JP)

(73) Assignee: Seki Kogyo Co., Ltd., Hiroshima (JP)

( * ) Notice: Subject to any disclaimer, the term of this patent is extended or adjusted under 35 U.S.C. 154(b) by 0 days.

(21) Appl. No.: 09/621,818

(22) Filed: Jul. 21, 2000

(30) Foreign Application Priority Data

Sep. 24, 1999 (JP) .................................................. 11-270727

(51) Int. Cl.[7] .................................................. B65G 59/06
(52) U.S. Cl. .................................. 414/797.4; 414/798.9; 414/798.7; 198/459.7; 221/298
(58) Field of Search ..................... 414/798.7, 798.9, 414/797.8, 751.1, 797.4; 198/750.13, 468.5, 459.7, 463.6; 221/298

(56) References Cited

U.S. PATENT DOCUMENTS

| | | | |
|---|---|---|---|
| 4,058,700 | * 11/1977 | Ito et al. ............................ | 219/137 R |
| 4,754,116 | * 6/1988 | Naruse et al. ..................... | 219/78.01 |
| 4,789,768 | * 12/1988 | Tobita et al. ...................... | 219/78.01 |
| 5,191,720 | * 3/1993 | Miura et al. ...................... | 33/785 |
| 5,360,137 | * 11/1994 | Shinjo et al. ..................... | 221/238 |
| 6,102,193 | * 8/2000 | River .............................. | 198/750.13 |

FOREIGN PATENT DOCUMENTS 6-238462 8/1994 (JP) .

* cited by examiner

Primary Examiner—Joseph A. Fischetti
(74) Attorney, Agent, or Firm—Eric J. Robinson; Nixon Peabody LLP

(57) ABSTRACT

The present invention discloses a nut feeder for the feeding of nuts for resistance welding. A stopper 12 is provided which is so energized as to enter into the inside of a chute 7 from a lower-end lateral side of the chute 7. A lowermost nut 5 in the chute 7 is held by the stopper 12, thereby being prevented from falling. With a pin 11 of the nut receiver 9 set against a projection part 29 of the stopper 12, a nut receiver 9 is moved backward together with the stopper 12, by which the holding of the nut 5 is released. Then the nut 5 is placed at a position ahead of the pin 11 of the nut receiver 9 while leaning against the stopper 12. Thereafter the nut receiver 9 is moved forward and the nut 5 falls down so that its threaded hole fits onto the pin 11 and is delivered to under the upper electrode.

2 Claims, 6 Drawing Sheets

NUT FEEDER FOR FEEDING NUTS FOR RESISTANCE WELDING

BACKGROUND OF THE INVENTION

The present invention relates to a nut feeder for the feeding of nuts for resistance welding.

Japanese Patent Gazette No. 2577177 (Japanese Unexamined Patent Gazette No. H06-238462) shows an example of a nut feeder for the feeding of nuts for resistance welding. This prior art nut feeder has a chute for feeding a plurality of nuts vertically continuously arranged one over the other with their respective threaded holes laying sideways and a piston rod which moves in a lateral direction under an opening of the chute, wherein a nut receiver is supported on an end of the piston rod and a pin which fits into the nut threaded hole is provided in an upper face of the nut receiver. In this nut feeding device, a nut at the lower end of the chute lands at the upper face of the piston rod. The piston rod is then moved backward, causing the nut receiver pin to be set against the lowermost nut. This is followed by tumbling-down of the nut so that the threaded hole of the nut fits onto the pin, wherein the nut is moved forward to arrive at under an upper electrode of the nut resistance welding equipment.

In accordance with the above-described nut feeder, it is however required that the chute be rocked vertically and the mechanism tends to be complicated. In other words, since a nut at the chute lower end lands on the piston rod upper face, it is required that the chute lower end be brought near the piston rod upper face for preventing the nut from falling and, on the other hand, when the nut receiver is moved backward to cause its pin to be set against the nut, it is necessary to separate the chute away from the piston rod upper face for allowing the nut to smoothly leave the chute.

Accordingly, an object of the present invention is to provide a nut feeder having a simple structure capable of receiving, without fail, nuts from the chute for feeding to under the upper electrode.

SUMMARY OF THE INVENTION

The present invention provides a nut feeder for feeding nuts for resistance welding between upper and lower electrodes of nut resistance welding equipment capable of welding together a work and a nut placed between the upper and lower electrodes by turning on an electric current, the nut feeder comprising:

a chute for feeding a plurality of nuts vertically arranged one over the other with their respective threaded holes laying sideways;

a nut receiver, underlying the chute and having on its upper face a pin fittable in the nut threaded hole, for receiving the plurality of nuts from the chute;

a stopper which is so energized as to enter into the inside of the chute from a lower-end lateral side of the chute thereby to push a nut against an internal wall surface of the chute so that the nut is held there and prevented from falling out of the chute, the stopper having a projection part which projects towards the nut receiver more than the nut which is being held against the chute internal surface; and nut receiver drive means by which:

(i) the nut receiver is moved backward together with the stopper with the nut receiver pin set against the projection part of the stopper so that the nut held against the chute internal surface is placed at a position ahead of the nut receiver pin while leaning against the stopper; and (ii) then the nut receiver is moved forward so that the nut falls down in such a way as to allow the nut's threaded hole to come to fit onto the pin and is located under the upper electrode.

In accordance with the present invention, the provision of the stopper for holding and preventing a lowermost nut in the chute from falling prevents a nut from falling out of the chute while the nut receiver is moved backward and forward between under the chute and the upper electrode. When the nut receiver is moved backward with the pin of the nut receiver set against the projection part of the stopper, the stopper is pushed by the nut receiver pin to move backward. This makes it possible to drop the lowermost nut in the chute at a position ahead of the nut receiver pin with the threaded hole of the lowermost nut laying sideways. The nut receiver is moved forward to cause the nut to fall down, thereby allowing the threaded hole of the nut to fit onto the nut receiver pin. Accordingly, without having to rock the chute, it is possible to receive, without fail, nuts from the chute for feeding to under the upper electrode.

It is preferable that:

the chute is inclined so that a nut is fed sliding at its bearing surface that is welded to a work;

the stopper is so provided as to enter into the inside of the chute from an opening formed in a slide surface of the chute and when moved backward together with the nut receiver, a front face of the stopper becomes flush with the chute slide surface.

As a result of such arrangement, when the stopper is moved backward, a nut will smoothly slide down to land at a position ahead of the nut receiver pin while leaning against the stopper.

PREFERRED EMBODIMENT OF THE INVENTION

An embodiment of the present invention will be described below by making reference to the accompanying drawing figures.

Figure 1:
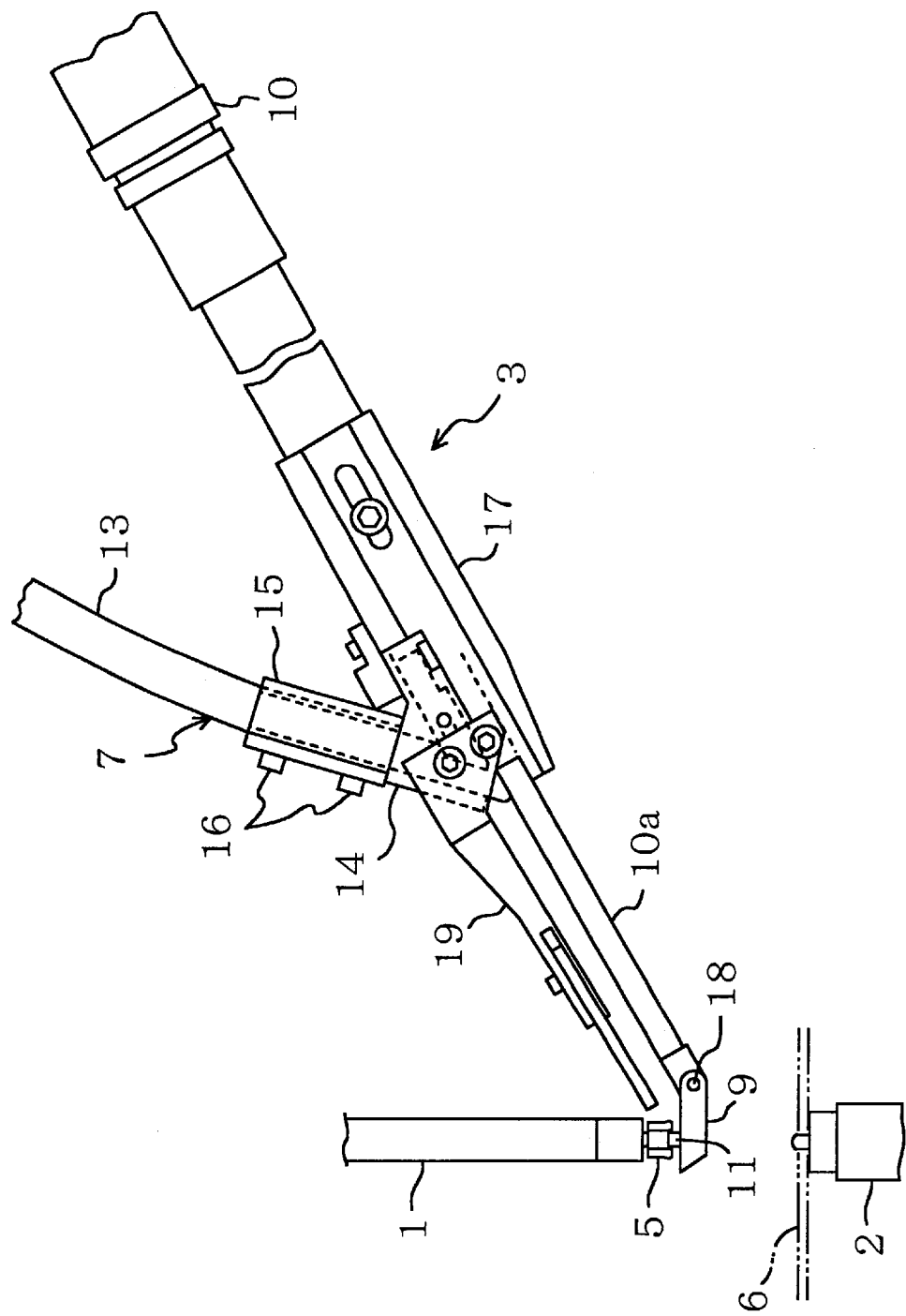
FIG. 1 is a side view of a nut feeder for the feeding of nuts for resistance welding in accordance with the present invention.

Referring to FIG. 1, there are shown an upper electrode 1 of nut resistance welding equipment, a lower electrode 2 of the nut resistance welding equipment, and a nut feeder 3 operable to feed a nut between the upper electrode 1 and the lower electrode 2. The upper electrode 1 is so provided as to ascend and descend with the aid of a cylinder device. A series of operations in a welding process is as follows. The nut feeder 3 feeds a nut 5 to under the upper electrode 1. The upper electrode 1 descends to receive the nut 5 from the nut feeder 3 and places the nut 5 on a work 6 overlying the lower electrode 2. An electric current is turned on, with the nut 5 and the work 6 between the upper and lower electrodes 1 and 2, whereby the nut 5 and the work 6 are welded together. This is followed by ascent of the upper electrode 1.

The nut feeder 3 has a nut feed chute 7, a nut receiver 9 for receiving the nut 5 from the chute 7, and a cylinder device 10 (nut receiver drive means) by which the nut receiver 9 reciprocates between the position whereat the chute 7 feeds the nut 5 and below the upper electrode 1. The feed position of the nut 5 by the chute 7 is located above the receive position of the nut 5 by the upper electrode 1 and the cylinder device 10 is therefore so constructed to reciprocatingly move the nut receiver 9 in an oblique direction.

The chute 7 is for feeding a great number of the nuts 5 with their threaded holes laying sideways (i.e., with the threaded holes oriented horizontally or with the threaded holes inclined). The nut receiver 9 has on its upper face (as a nut reception face) a pin 11 which fits in the threaded hole of the nut 5. The nut receiver 9 is supported on an end of a piston rod 10a of the cylinder device 10. The nut receiver 9 is vertically rotatable by a horizontal pivot 18 and is so energized by a kick spring (not shown in the figure) as to rotate upward to keep the upper face horizontal.

Since the nut 5 is fed with its threaded hole laying sideways, this results in the requirement that the nut 5 be tumbled down when placing it on the nut receiver 9 so that the threaded hole of the nut 5 fits onto the pin 11. To this end, a stopper 12 (which will be described later) is provided which operates in cooperation with the operation of the nut receiver 9. The description of the stopper 12 will be made below.

The chute 7 comprises a tube 13 for feeding a great number of the nuts 5 vertically arranged one over the other with their threaded holes laying sideways and a lower member 14 connected to a lower end of the tube 13. The tube 13 and the lower member 14 are connected together by a connection pipe 15. In other words, the connection pipe 15 is welded to the lower member 14 and the tube 13 is fit into the connection pipe 15 and fixed thereto by screws 16. The lower member 14 is fixedly secured to a pipe 17 attached to a cylinder portion end of the cylinder device 10 for nut reception. Fixedly secured to the pipe 17 is a nut feed guide 19.

Figure 2:
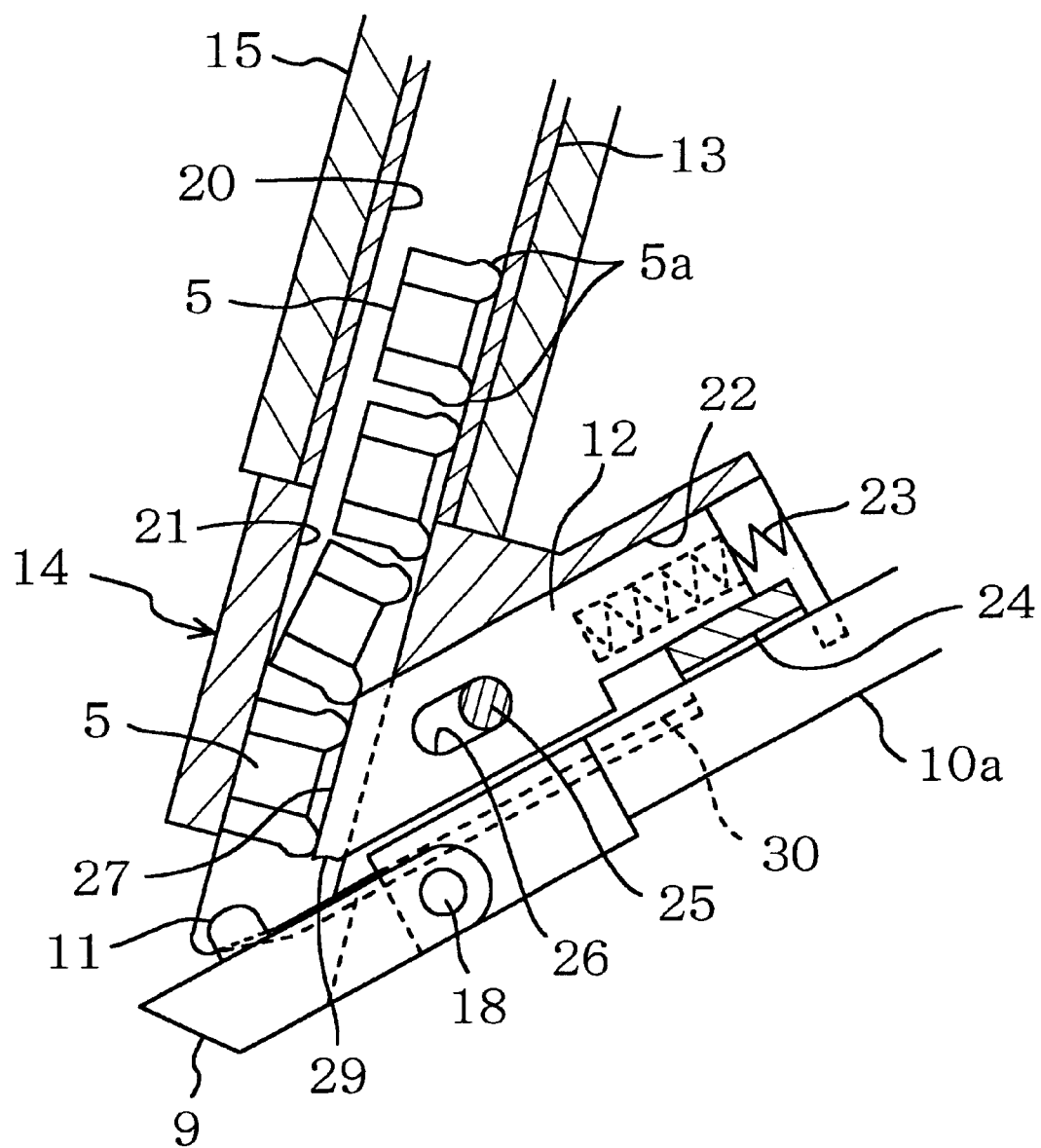
FIG. 2 is a cross-sectional view showing in enlarged manner a part of the nut feeder, depicting a state in which a lowermost nut is being held by a stopper.

As shown in FIG. 2, the lower member 14 has a nut passage 21 in communication with a nut passage 20 of the tube 13, these two passages having the same diameter, and a guide groove 22 for the stopper 12 which intersects with a lower portion of the nut passage 21, wherein the nut passage 21 forms a part of the chute 7.

The nut passage 21 intersects with a direction in which the nut receiver 9 moves backward and forward at an angle of about 45 degrees and inclines somewhat in a direction away from the upper electrode 1 from the vertical. The nut passage 21 has a passage diameter in a direction of the threaded hole of the nut 5 which is slightly greater than the dimension of the nut 5 in the same direction. It is arranged such that the nut 5 falls down, with its welding projection 5a rocking on an inclined internal wall at the rear side of the nut passage 21.

The guide groove 22 is a reversed concave in cross section with its lower side opened. The guide groove 22 is formed on the back side (opposite to the upper electrode 1) of the nut passage 21, extends in the direction in which the nut receiver 9 moves backward and forward, and opens to the lower portion of the nut passage 21.

The stopper 12 is fit into the guide groove 22 of the lower member 14 and is energized by a spring 23 in a direction of entering into the inside of the nut passage 21. In order to guide the backward/forward movement of the stopper 12, a support plate 24 for supporting the rear portion of the stopper 12 is disposed at the rear of the guide groove 22, being fixedly secured to the lower member 14 and, in addition, a horizontal pin 25 of the lower member 14 is fit into an elongated hole 26 of the stopper 12, being movable in the direction in which the stopper 12 moves backward and forward.

The elongated hole 26 passes through the stopper 12 from side to side, elongating in the direction of the guide groove 22. By engagement with the horizontal pin 25 of the lower member 14, the elongated hole 26 guides the backward/forward movement of the stopper 12 and regulates the withdrawal position of the stopper 12.

The stopper 12, whose front face is so inclined as to be flush with the nut passage 21 when withdrawn, has a striking part 27. In order to prevent the lowermost nut 5 in the chute 7 from dropping, the stopper 12 is so energized by the spring 23 as to enter Into the inside of the nut passage 21 to push, at the striking part 27, the nut 5 against the internal wall of the nut passage 21 of the lower member 14 on the front face side. In this way, the nut 5 is held. The stopper 12 further has a projection part 29 underneath the striking part 27 which projects downward more than the nut 5 held by the striking part 27.

Figure 3:
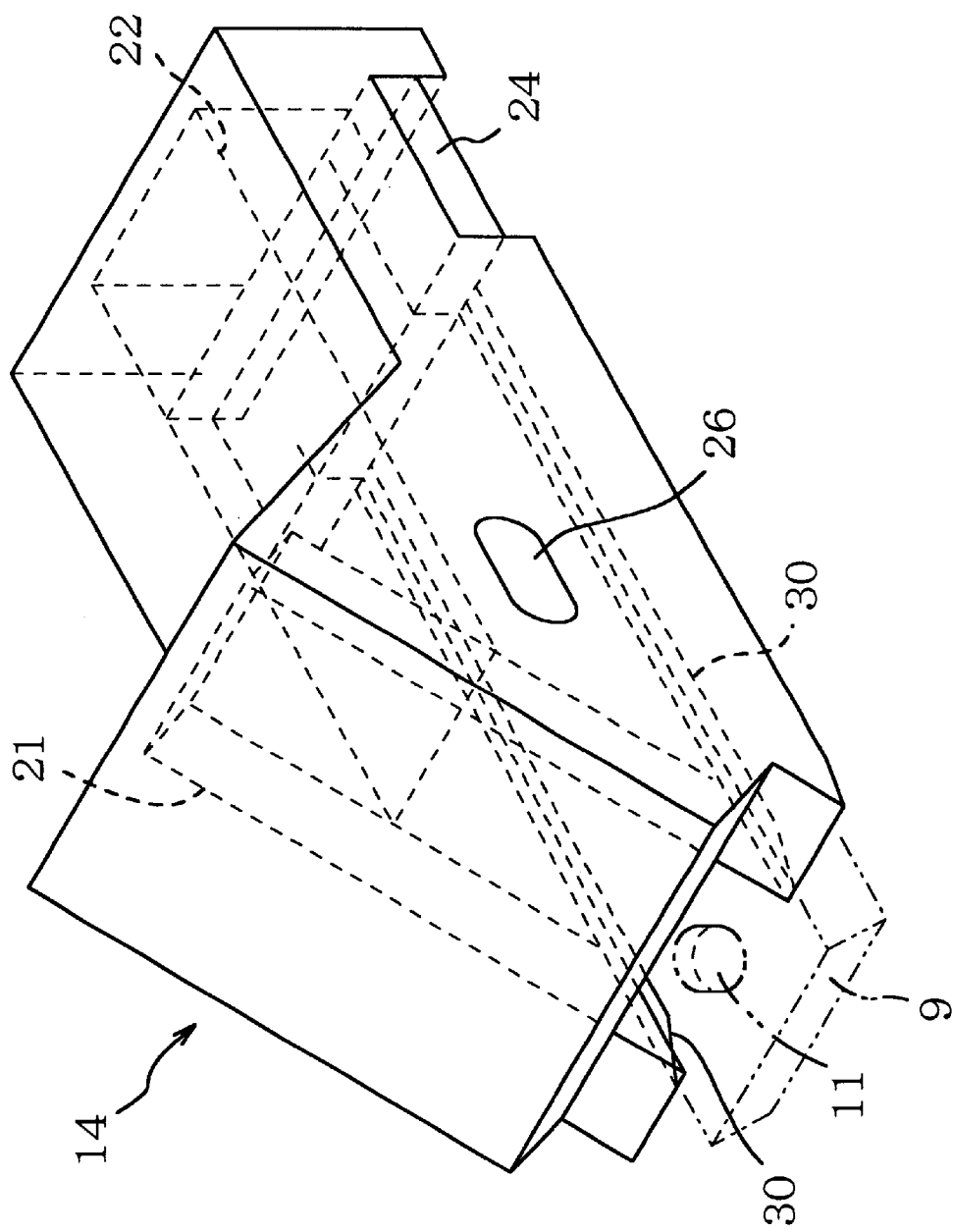
FIG. 3 is a perspective view showing a lower member at the lower end of a chute of the nut feeder.

As FIG. 3 shows, formed at lower edges of both side walls of the guide groove 22 of the lower member 14 are guide parts 30 and 30. When the nut receiver 9 retreats, the nut receiver 9 Is guided by the guide parts 30 and 30 so that its upper face runs parallel with the direction in which the nut receiver 9 moves backward and forward, allowing the pin 11 to be in abutment with the projection part 29 of the stopper 12.

In order to prevent the nut 5 supported on the nut receiver 9 from falling out of the pin 11 while traveling from the feed position whereat the chute 7 feeds the nut 5 to under the upper electrode 1, the nut feed guide 19 holds the nut 5 in the nut receiver 9. The nut feed guide 19 extends in the direction in which the nut receiver 9 moves backward and forward.

Figure 4:
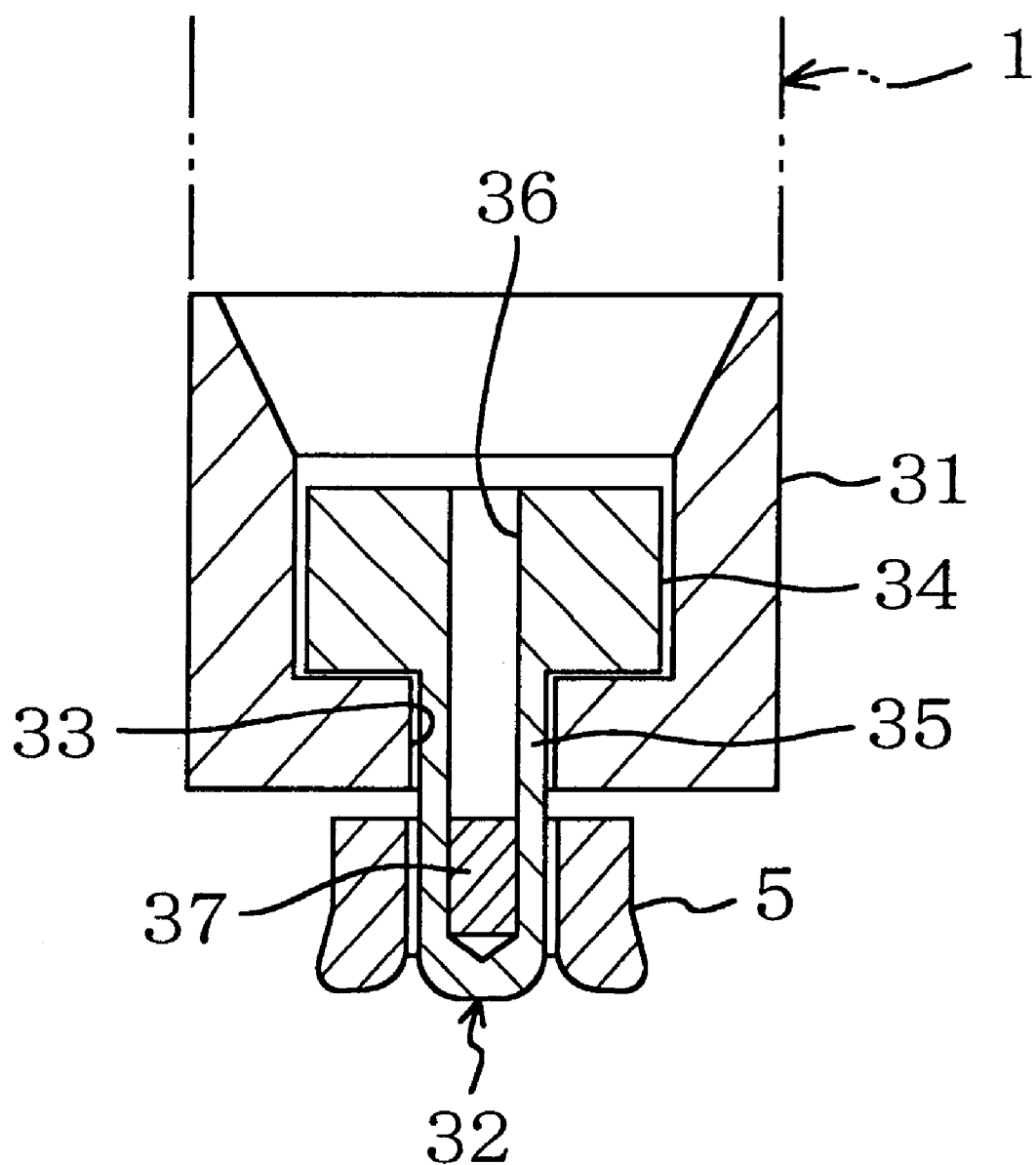
FIG. 4 is a cross-sectional view showing a structure of an upper electrode chip portion of nut resistance welding equipment.
Figure 5:
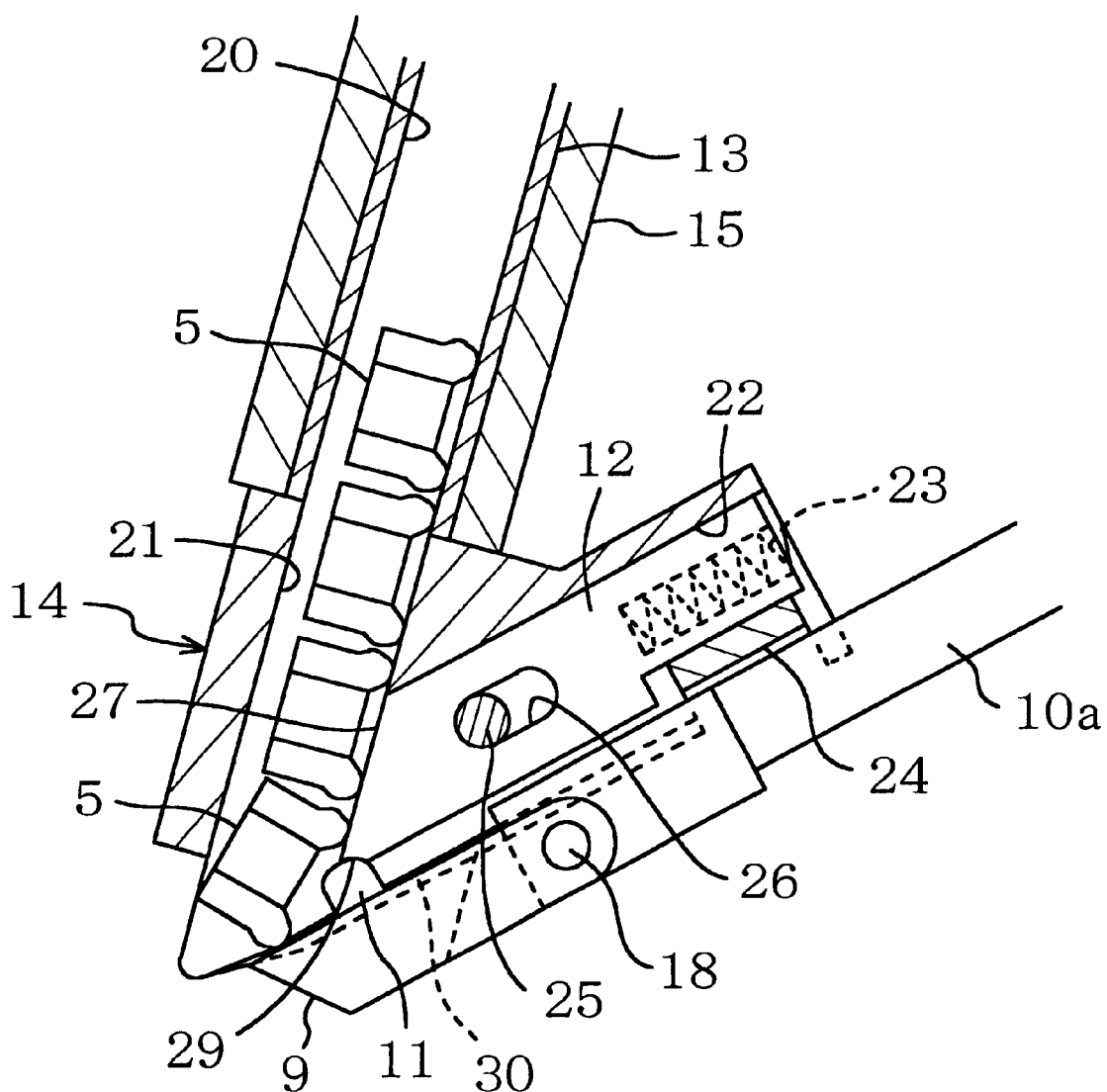
FIG. 5 is a view similar to FIG. 2, illustrating a state in which the holding of the lowermost nut by the stopper is released.

Referring to FIG. 4, there are shown the structures of an electrode chip 31 and a guide pin 32 in the upper electrode 1. The electrode chip 31 has a taper fit hole which opens upward, wherein a through hole 33 is formed in its bottom center. By virtue of the taper fit hole, the electrode chip 31 is fit on a shank 34 of the upper electrode 1 for attachment thereto. The guide pin 32 has a head part 35 of large diameter and a pin part 36 of small diameter. There is formed a shaft hole 37 which extends from the top of the head part 35 to a vicinity of the end of the pin part 36. Embedded in the end of the shaft hole 37 is a permanent magnet 38. At the center of the lower end of the shank 34, a cylinder hole 39 is formed in the shaft direction. At the upper end of the cylinder hole 39, a pressure air passage 40 is in communication with the cylinder hole 39.

Whereas the pin part 36 of the guide pin 32 is inserted in the through hole 33 of the electrode chip 31, the head part 35 is vertically movably fit into the cylinder hole 39 of the shank 34. The permanent magnet 38 is energized upward by a spring 41 so that the permanent magnet 38 is concealed in the electrode chip 31. Moreover, the pin part 36 of the guide pin 32 projects from the electrode chip 31 by air pressure from the pressure air passage 40 against energization of the spring 41.

Accordingly, as illustrated in FIG. 2, the striking part 27 of the stopper 12 projects into the inside of the nut passage 21 of the lower member 14 by energization of the spring 23 when the pin 11 of the nut receiver 9 lies ahead, wherein the lowermost of the nuts 5 in the chute 7 present in the nut passage 21 is held by being pushed by the striking part 27 against the internal wall face of the nut passage 21 on the front side so that the lowermost nut 5 is prevented from falling.

In such a state, when the nut receiver 9 retreats, the pin 11 of the nut receiver 9 passes beneath the lowermost nut 5 to hit the projection part 29 of the stopper 12, thereby forcing the stopper 12 to retreat against energization of the spring 23 so that the striking part 27 becomes flush with the internal surface of the nut passage 21 on the rear side. Because of this, the holding of the lowermost of the nuts 5 by the stopper 12 is released, as a result of which each of the nuts 5 in the chute 7 is shifted downward. The lower end of the lowermost nut 5 lands at a position ahead of the pin 11 on the upper face of the nut receiver 9, wherein the lowermost nut 5 enters the state in which the lowermost nut 5 leans against the striking part 27 of the stopper 12 to increase slightly in the degree of inclination, with the welding projection 5a facing downward.

Figure 6:
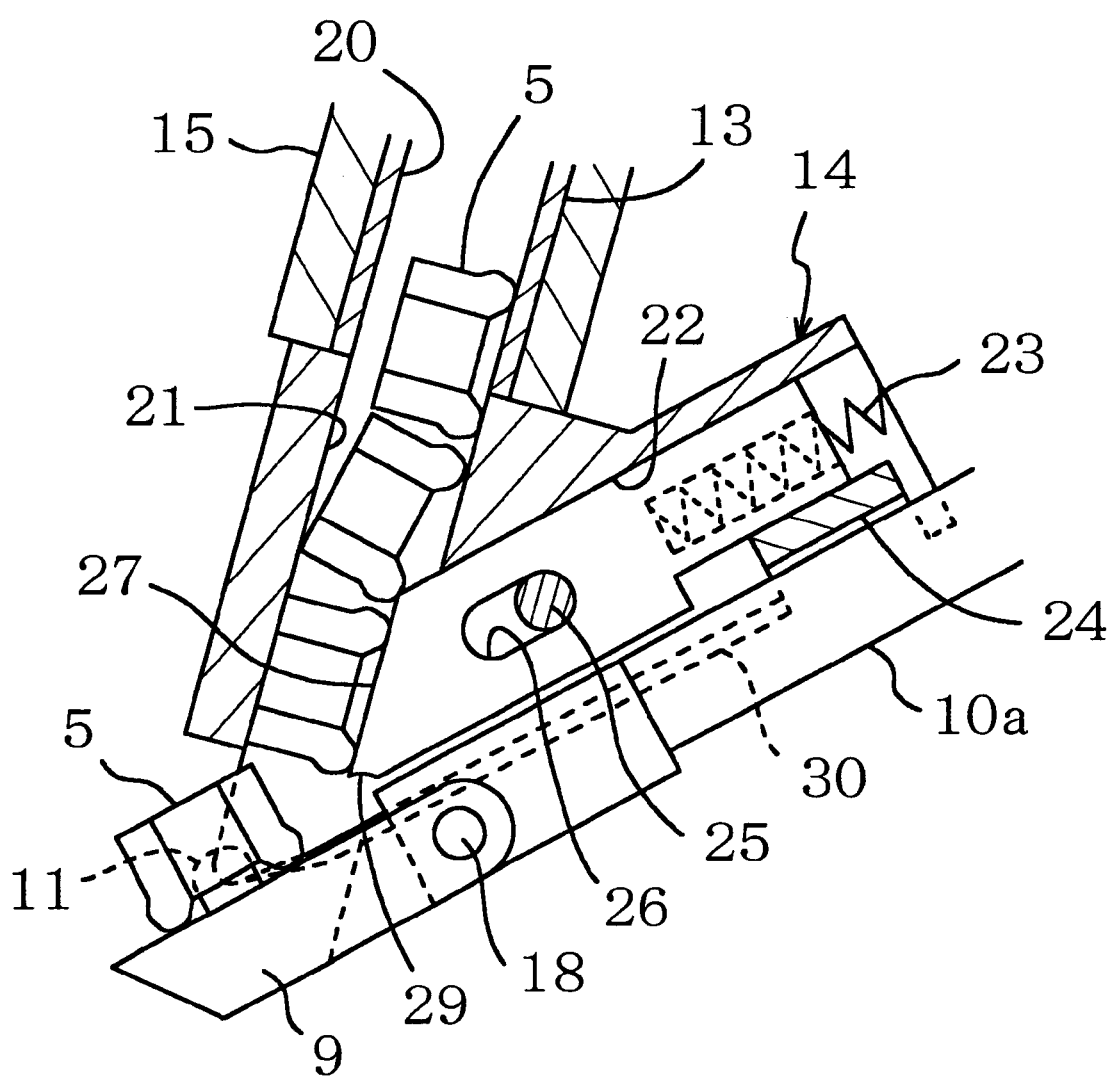
FIG. 6 is a view similar to FIG. 2, illustrating a state in which the lowermost nut is received in a nut receiver.

Thereafter, the nut receiver 9 is moved forward by the cylinder device 9 and, as a result, the stopper 12 is also moved forward together with the pin 11 of the nut receiver 9. Accordingly, the lowermost nut 5 moves forward while being inclined. However, the stopper 12 is prevented by the horizontal pin 25 from moving forward, after which only the nut receiver 9 continues moving forward. Because of this, the nut 5 is no longer supported by the stopper 12, therefore tumbling onto the upper face of the nut receiver 9, as shown in FIG. 6. Then the threaded hole of the nut 5 is fit onto the pin 11, while the stopper 12 enters the state of pushing the next nut 5 against the internal wall surface of the nut passage 21 at the lower front side in order to prevent it from falling.

While being held by the nut feed guide 19, the nut 5 overlying the nut receiver 9 is delivered to directly under the upper electrode 1. At the moment the nut 5 leaves the guide 19, i.e., at the moment the nut 5 arrives at directly under the upper electrode 1, the nut 5 ascends by energization by the kick spring, thereafter being fit onto the pin part 36 of the guide pin 32 which has projected by air pressure of the upper electrode 1 whereat the nut 5 which is a strong magnetic body is held by the permanent magnet 38.

When the upper electrode 1 is made to descend, the nut receiver 9 is pushed down by the upper electrode 1 against energization of the kick spring, to move sideways to "take shelter". While being attracted and held by the magnet 38, the nut 5 descends together with the upper electrode 1 to land on the work 6 over the lower electrode 2. At the same time, application of air pressure to the guide pine 32 is stopped so that the guide pin 32 ascends by energization of the spring 41 and the magnet 38 is concealed in the electrode chip 31. This accordingly prevents the magnet 38 from loosing its magnetic force by welding heat.

What is claimed is:

1. A nut feeder for feeding nuts for resistance welding between upper and lower electrodes of nut resistance welding equipment capable of welding together a work and a nut placed between the upper and lower electrodes by turning on an electric current, the nut feeder comprising:

a chute for feeding a plurality of nuts each having a threaded hole, in which the nuts are vertically arranged in one line such that each of the threaded holes makes a right angle with a longitudinal axis of the chute, a lower portion of an internal wall face of the chute being opened to an outside;

a nut receiver for receiving the nuts from the chute, which is provided under the chute so as to be movable backwards and forwards in a direction toward a space between the upper and lower electrodes, the nut receiver having an upper face on which a pin fittable in the threaded hole of each of the nuts is disposed;

a stopper provided such that the stopper is movable backwards and forwards in a direction toward the lower opened portion of the internal wall face of the chute, the stopper comprising a projection part which projects downward from a lower edge of a front face of the stopper, wherein when the stopper is moved forwards, the stopper pushes an adjacently disposed nut against the internal wall face of the chute to hold the nut; and nut receiver drive means for moving the nut receiver together with the pin backwards to have the pin hit the projection portion of the stopper so that the stopper is moved backward, thereby to shift the nut such that one of two edges thereof is placed ahead of the pin of the nut receiver while the other edge thereof is leaned against the front face of the stopper and for moving the nut receiver together with the pin forwards so that the nut falls down and the pin of the nut receiver is fitted in the threaded hole of the fallen nut and the stopper is moved forward and for further moving the nut receiver together with the pin fitted in the threaded hole of the nut forwards to a position under the upper electrode.

2. The nut feeder for feeding nuts for resistance welding of claim 1, wherein the chute is inclined so that the nut is fed sliding at a bearing surface of the nut that is welded to the work; and wherein when the stopper is moved backwards together with the nut receiver, the front face of the stopper becomes flush with a surface of the chute.

* * * * *